United States Patent
Sung et al.

(10) Patent No.: US 12,034,130 B2
(45) Date of Patent: *Jul. 9, 2024

(54) BATTERY PACK MANAGEMENT DEVICE

(71) Applicant: LG ENERGY SOLUTION, LTD., Seoul (KR)

(72) Inventors: Chang-Hyun Sung, Daejeon (KR); Jae-Dong Park, Daejeon (KR); Sang-Hoon Lee, Daejeon (KR); Yean-Sik Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,678

(22) Filed: Feb. 9, 2023

(65) Prior Publication Data

US 2023/0198030 A1 Jun. 22, 2023

Related U.S. Application Data

(63) Continuation of application No. 17/189,729, filed on Mar. 2, 2021, now Pat. No. 11,695,164, which is a (Continued)

(30) Foreign Application Priority Data

Jul. 6, 2017 (KR) .................. 10-2017-0085997

(51) Int. Cl.
*H01M 10/42* (2006.01)
*B60L 3/12* (2006.01)
(Continued)

(52) U.S. Cl.
CPC ........... *H01M 10/425* (2013.01); *B60L 50/50* (2019.02); *H01M 10/42* (2013.01); *H01M 10/48* (2013.01);
(Continued)

(58) Field of Classification Search
CPC .... H01M 10/425; H01M 10/42; H01M 10/48; H01M 10/482; H01M 10/486;
(Continued)

(56) References Cited

U.S. PATENT DOCUMENTS 10,971,763 B2   4/2021   Sung et al.
11,695,164 B2 *  7/2023   Sung ................. B60L 50/50
                                                 429/90

(Continued)

FOREIGN PATENT DOCUMENTS

CN   101154823 A   4/2008
CN   102355015 A   2/2012

(Continued)

OTHER PUBLICATIONS

International Search Report for PCT/KR2018/006911 (PCT/ISA/210) mailed on Oct. 8, 2018.

(Continued)

*Primary Examiner* — Matthew W Van Oudenaren
(74) *Attorney, Agent, or Firm* — Birch, Stewart, Kolasch & Birch, LLP (57) ABSTRACT

A battery pack management device capable of reducing power consumption while transmitting and receiving data between a master BMS and a slave BMS by using a wireless communication method. The battery pack management device according to the present disclosure includes: a master BMS including an external communicator, an internal communicator, and a master controller and a slave BMS including a power supply, a state measurement sensor, a slave wireless communicator, and a slave controller.

11 Claims, 3 Drawing Sheets

Related U.S. Application Data continuation of application No. 16/342,885, filed as application No. PCT/KR2018/006911 on Jun. 19, 2018, now Pat. No. 10,971,763.

(51) Int. Cl.
  *B60L 50/50* (2019.01)
  *H01M 10/48* (2006.01)
  *H02J 7/00* (2006.01)
  *H02J 13/00* (2006.01)

(52) U.S. Cl.
  CPC ....... *H01M 10/482* (2013.01); *H01M 10/486* (2013.01); *B60L 3/12* (2013.01); *B60L 2240/54* (2013.01); *B60L 2240/80* (2013.01); *H01M 2010/4271* (2013.01); *H01M 2010/4278* (2013.01); *H01M 2220/20* (2013.01); *H02J 7/0018* (2013.01); *H02J 13/00022* (2020.01)

(58) Field of Classification Search
  CPC . H01M 2010/4271; H01M 2010/4278; H01M 2220/20; B60L 50/50; B60L 3/12; B60L 2240/54; B60L 2240/80; B60L 2240/545; B60L 2240/547; B60L 2260/54; B60L 58/21; B60L 53/305; B60L 53/66
  See application file for complete search history.

(56) References Cited

U.S. PATENT DOCUMENTS

| | | | |
|---|---|---|---|
| 2004/0039611 A1 | 2/2004 | Hong et al. | |
| 2011/0082621 A1* | 4/2011 | Berkobin | B60L 58/16 |
| | | | 701/31.4 |
| 2011/0156644 A1* | 6/2011 | Arai | H01M 10/48 |
| | | | 320/109 |
| 2013/0271072 A1* | 10/2013 | Lee | H01M 10/4207 |
| | | | 320/108 |
| 2014/0266062 A1 | 9/2014 | Lee | |
| 2014/0347013 A1 | 11/2014 | Kim | |
| 2015/0163737 A1 | 6/2015 | Gao et al. | |
| 2016/0137091 A1 | 5/2016 | Yamazoe et al. | |
| 2016/0268642 A1 | 9/2016 | Yamazoe et al. | |
| 2018/0012484 A1 | 1/2018 | Sakabe et al. | |

FOREIGN PATENT DOCUMENTS

| | | |
|---|---|---|
| CN | 102738525 A | 10/2012 |
| CN | 104617633 A | 5/2015 |
| CN | 106911152 A | 6/2017 |
| EP | 3413433 A1 | 12/2018 |
| JP | 2016-143113 A | 8/2016 |
| KR | 10-2004-0017465 A | 2/2004 |
| KR | 10-2013-0101457 A | 9/2013 |
| KR | 10-2014-0060801 A | 5/2014 |
| KR | 10-2014-0073949 A | 6/2014 |
| KR | 10-2015-0080446 A | 7/2015 |
| KR | 10-2016-0073109 A | 6/2016 |
| KR | 10-1649813 B1 | 8/2016 |
| KR | 10-2016-0103403 A | 9/2016 |
| KR | 10-1663086 B1 | 10/2016 |
| KR | 10-2017-0059226 A | 5/2017 |
| KR | 10-1749185 B1 | 6/2017 |
| WO | WO 2015/063945 A1 | 5/2015 |
| WO | WO2017/150709 A1 | 9/2017 |

OTHER PUBLICATIONS

Xiang et al., "A Sniff Scheduling Policy for Power Saving in Bluetooth Piconet", IEEE, Proceedings of the 2005 11th International Conference on Parallel and Distributed Systems (ICPADS'05), 2005, 6 pages.

* cited by examiner

BATTERY PACK MANAGEMENT DEVICE

CROSS-REFERENCE TO RELATED APPLICATIONS

This application is a continuation of U.S. application Ser. No. 17/189,729, filed on Mar. 2, 2021, which is a Continuation of application Ser. No. 16/342,885 filed on Apr. 17, 2019 (now U.S. Pat. No. 10,971,763 issued on Apr. 6, 2021), which is the National Phase under 35 U.S.C. § 371 of International Application No. PCT/KR2018/006911, filed on Jun. 19, 2018, which claims the benefit under 35 U.S.C. § 119 to Korean Patent Application No. 10-2017-0085997, filed in the Republic of Korea on Jul. 6, 2017, all of which are hereby expressly incorporated by reference into the present application.

TECHNICAL FIELD

The present disclosure relates to battery management technology, and more particularly, to technology for managing a vehicle battery pack mounted on a vehicle and performing wireless communication between a master battery management system (BMS) and a slave BMS.

BACKGROUND ART

Batteries are rapidly spreading to mobile devices, such as mobile phones, laptop computers, smart phones, and smart pads, electric vehicles (EVs, HEVs, PHEVs), and energy storage system (ESS). Such a battery may be combined with a battery management system (BMS) that controls overall operation of the battery.

A battery pack, particularly a middle- or large-sized battery pack used in an vehicle or an ESS, may include a plurality of battery modules. The plurality of battery modules have a multi-module structure in which the battery modules are connected in series and/or in parallel, thereby increasing the capacity and/or the output of the battery pack.

Such a multi-structure battery pack may be implemented in various forms according to circuit logic, PCB configuration, or the like. In this case, a multi-slave structure is mainly used in a BMS so as to improve the efficiency of monitoring and control. The multi-slave structure is configured such that a plurality of slave BMSs respectively manage a plurality of battery modules constituting the battery pack, and a master BMS integrally controls the plurality of slave BMSs.

In a related-art battery pack, the data transmission and reception between the master BMS and the slave BMS is mainly performed by a wired method. That is, connectors provided at both ends of a cable are respectively connected to the master BMS and the slave BMS, and the master BMS and the slave BMS exchange data with each other through the cable.

However, when the master BMS and the slave BMS communicate with each other in such a wired manner, there is a problem that a circuit failure occurs due to a contact failure of the connector, a disconnection of the cable, or the like. In addition, in the case of such a wired communication, a space for installing the connector, the cable, and the like is required, it is difficult to assemble the battery pack due to the connector, the cable, and the like, and the costs for manufacturing insulating elements, connectors, cables, and the like are added.

Recently, in order to solve the problem of the wired communication method, attempts have been made to employ a wireless communication method between a master BMS and a slave BMS of a battery pack. However, there are many problems to be solved when using such a wireless communication method, and thus the wireless communication method between the master BMS and the slave BMS has not been easily employed in the battery pack.

In particular, one of the problems of the wireless communication method is a standby power consumption problem. That is, in order to perform wireless communication between the master BMS and the slave BMS in the battery pack, a receiving unit, particularly a receiving unit of the slave BMS that receives a command from the master BMS, must be turned on. For example, in the slave BMS, an amplifier may be set to be always turned on so as to receive a radio frequency (RF) signal from the master BMS.

Power is required in order for the wireless receiving unit of the slave BMS to maintain the turned-on state, for example, in order for the amplifier to maintain the turned on state. Since the slave BMS is mainly supplied with power from the battery module, the wireless receiving unit of the slave BMS needs to be continuously supplied with power from the battery module for turn-on. However, in this case, there is a problem that power of the battery module is unnecessarily consumed. Furthermore, in the case of a vehicle battery pack, if a vehicle is not in operation and power of the battery module is consumed during parking, there may occur a problem that the vehicle does not start up or a driving distance is shortened when the vehicle is required to operate.

DISCLOSURE

Technical Problem

The present disclosure is designed to solve the problems of the related art, and therefore the present disclosure is directed to providing a battery pack management device capable of reducing power consumption while transmitting and receiving data between a master BMS and a slave BMS by using a wireless communication method, and a battery pack including the battery pack management device, and a vehicle including the battery pack management device.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack management device including one or more battery modules each including a plurality of secondary batteries, the battery pack management device including: a master battery management system (BMS) including an external communicator configured to transmit and receive a signal to and from an external device, an internal communicator configured to transmit and receive a wireless communication signal, and a master controller configured to process data received through the external communicator and the internal communicator and at least one slave BMS including a power supply configured to receive power from the battery module and transmit the received power, a state measurement sensor configured to measure state information of at least one of a voltage and a temperature of the battery module, a slave wireless communicator configured to transmit and receive the wireless communication signal to and from the master BMS, and a slave controller configured to control an on/off time of the slave wireless communicator.

Here, the slave wireless communicator may be turned on or off at a predetermined period.

In addition, the slave controller may be configured to control the on/off time of the slave wireless communicator according to a parking time of a vehicle.

In addition, the slave controller may be configured to increase a turn-off time of the slave wireless communicator as the parking time of the vehicle increases.

In addition, the slave controller may be configured to control the on/off time of the slave wireless communicator according to a voltage of the battery module that is measured by the state measurement sensor.

In addition, the slave controller may be configured to increase a turn-off time of the slave wireless communicator as the measured voltage of the battery module decreases.

In addition, the slave controller may be configured to control the on/off time of the slave wireless communicator according to a temperature of the battery module that is measured by the state measurement sensor.

In addition, the slave controller may be configured to increase a turn-off time of the slave wireless communicator as the measured temperature of the battery module decreases.

In addition, the control module may be configured to control the on/off time of the slave wireless communicator according to a traveling time pattern of a vehicle.

In addition, the slave controller may be configured to set a time zone in which a traveling start frequency of the vehicle is highest, and decrease a turn-off time of the slave wireless communicator in the set time zone.

In addition, in another aspect of the present disclosure, there is also provided a battery pack including the battery pack management device according to the present disclosure.

In addition, in another aspect of the present disclosure, there is also provided a vehicle including the battery pack management device according to the present disclosure.

Advantageous Effects

According to an aspect of the present disclosure, communication is performed between a master BMS and a slave BMS through a wireless method. Thus, it is possible to solve or reduce a problem of the related-art wired communication method, for example, a problem such as a circuit failure due to a contact failure of a connector or a disconnection of a cable, a volume increase and structural complexity of a battery pack, a reduction in assemblability, and an increase in costs.

Furthermore, according to an aspect of the present disclosure, it is possible to solve or minimize a problem that power is unnecessarily consumed to receive a wireless signal.

In particular, according to an embodiment of the present disclosure, it is possible to solve a problem that standby power is excessively consumed since an amplifier is continuously turned on in order for a slave BMS to receive a signal from a master BMS.

Therefore, according to these aspects of the present disclosure, it is possible to solve a problem that a vehicle does not start up or a driving distance is shortened due to power deficiency of a battery pack in a situation in which the battery pack has to be used, particularly in a situation in which a vehicle has to be in operation.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
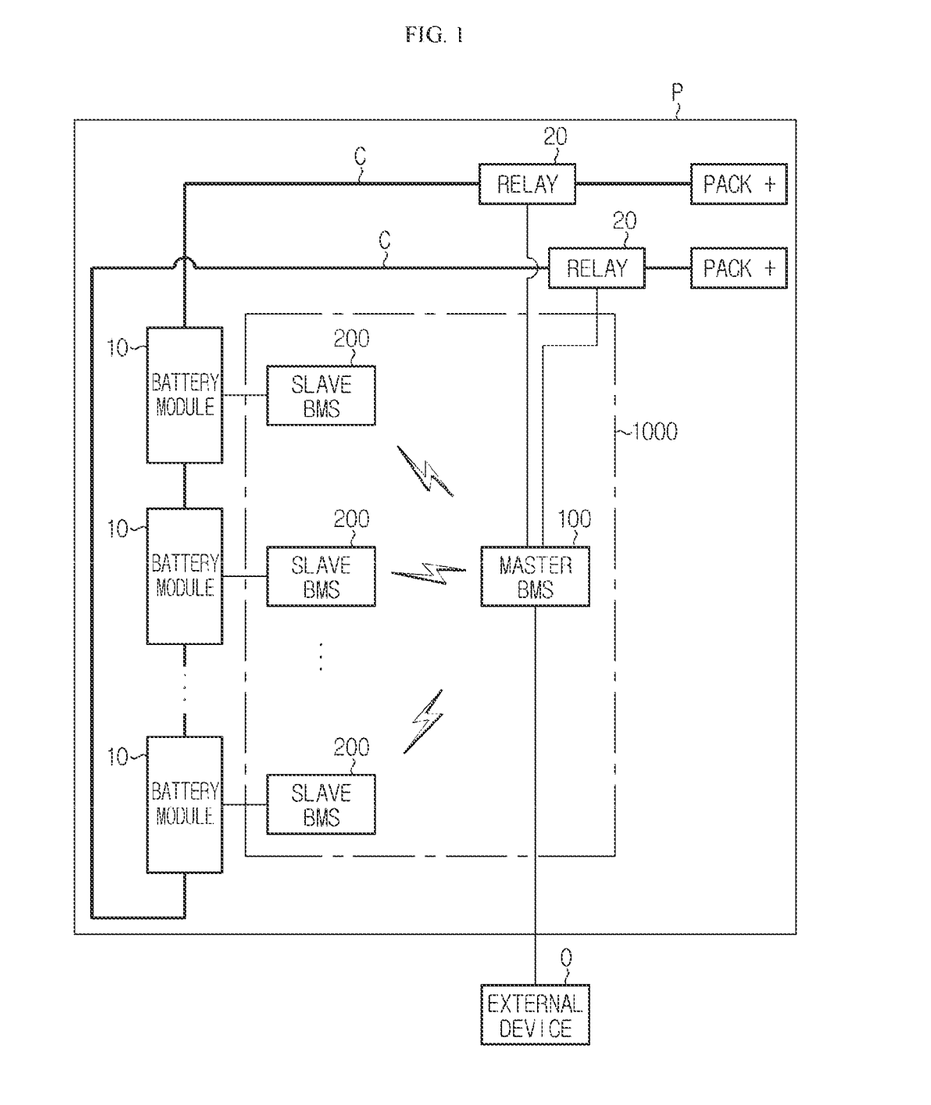
FIG. 1 is a diagram schematically illustrating a configuration of a battery pack management device according to an embodiment of the present disclosure.

FIG. 1 is a diagram schematically illustrating a configuration of a battery pack management device according to an embodiment of the present disclosure.

Referring to FIG. 1, one or more battery modules 10 may be included in a battery pack P to which a battery pack management device 1000 according to the present disclosure is applied. In particular, the battery pack P may include a plurality of battery modules 10, and each of the battery modules 10 may be electrically connected in series and/or in parallel. Therefore, the output and/or the capacity of the battery pack P may be increased by the electrical connection of the battery modules 10.

Each of the battery modules 10 may include a plurality of secondary batteries. The plurality of secondary batteries included in the battery module 10 may be electrically connected to each other, thereby increasing the output and/or the capacity of the battery module 10.

In addition, the battery pack, to which the battery pack management device 1000 according to the present disclosure is applied, may be mounted on a vehicle. That is, the battery pack including the battery pack management device according to the present disclosure may be a vehicle battery pack. The vehicle may be a car that is supplied with driving power for driving, or is supplied with operating power for operating electronic components, such as audio, air conditioner, and the like, by the battery pack. In particular, the vehicle may be a car that is supplied with driving power from the battery pack, for example, an electric vehicle such as EV, a hybrid vehicle such as HEV or PHEV, and the like.

As illustrated in FIG. 1, the battery pack management device 1000 according to the present disclosure may include a master BMS 100 and a slave BMS 200.

The master BMS 100 may be provided in the battery pack P to exchange data with an external device O of the battery pack P. The external device O of the battery pack P is a device disposed outside the battery pack P, and may be another device mounted on the vehicle, for example, a controller such as an electronic control unit (ECU).

In addition, the master BMS 100 may execute a function of integrally controlling one or more slave BMSs 200 provided in the battery pack P. To this end, the master BMS 100 may transmit and receive necessary information through communication with the respective slave BMSs 200.

In particular, as illustrated in FIG. 1, the master BMS 100 of the battery pack management device according to the present disclosure may be configured to perform wireless communication with the slave BMS 200.

Figure 2:
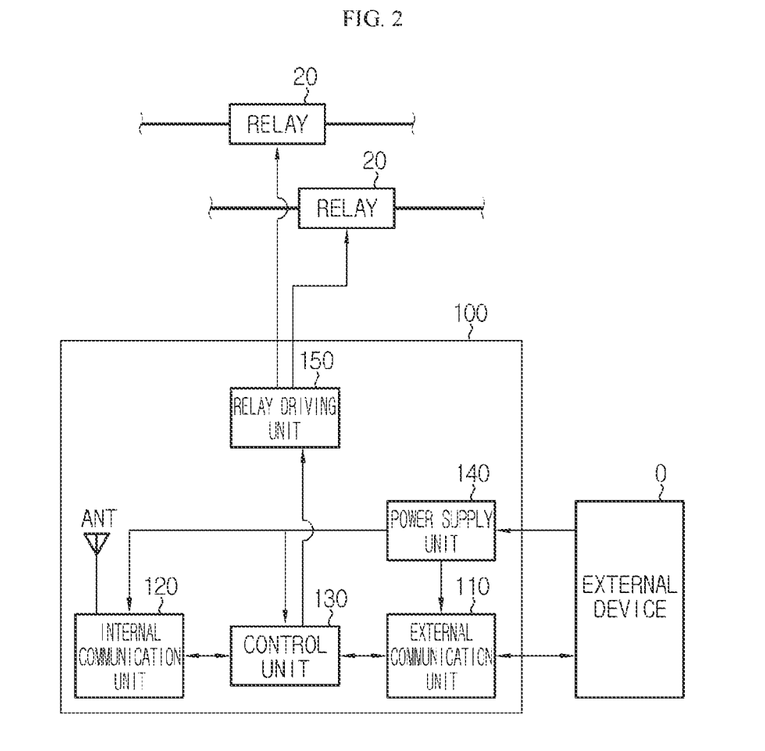
FIG. 2 is a block diagram schematically illustrating a functional configuration of a master battery management system (BMS) according to an embodiment of the present disclosure.

FIG. 2 is a block diagram schematically illustrating a functional configuration of the master BMS 100 according to an embodiment of the present disclosure.

Referring to FIG. 2, the master BMS 100 may include an external communication unit 110, an internal communication unit 120, and a control unit 130.

The external communication unit 110 may be configured to transmit and receive a signal to and from the external device O of the battery pack, such as an ECU of a vehicle. The external communication unit 110 may be connected to the external device O by wire. For example, the external communication unit 110 may be connected to the external device O by using a cable in the vehicle. The external communication unit 110 may receive a command or information from the external device O through the cable, or may be transmit a command or information to the external device O through the cable. For example, the external communication unit 110 may transmit information about a state of a battery pack to the external device O.

Since the external communication unit 110 communicates with the external device O by a wired method, the external communication unit 110 may be referred to as a wired communication unit. The present disclosure is not necessarily limited to such configurations, and the external communication unit 110 may be connected to the external device O by a wireless method.

The internal communication unit 120 may wirelessly transmit and receive a signal to and from a slave BMS 200 provided in the battery pack. For example, the internal communication unit 120 may receive information about a voltage or a temperature of each battery module 10 from the slave BMS 200 as a wireless signal. To this end, the internal communication unit 120 may include a radio frequency integrated circuit (RFIC). In addition, the internal communication unit 120 may include an antenna.

In particular, the master BMS 100 may generally include a microcontroller unit (MCU), and the RFIC may convert a signal received from the MCU into a wireless communication signal and transmit the wireless communication signal to the slave BMS 200. In addition, in this case, the RFIC may convert a wireless communication signal received from the slave BMS 200 into a wired communication signal and transmit the wired communication signal to the MCU.

The master BMS 100 may include a plurality of RFICs. For example, the internal communication unit 120 may include as many RFICs as the number of slave BMSs 200 included in the battery pack, and the RFICs may manage the slave BMSs 200, respectively.

The control unit 130 may perform an operation of processing data received from the external communication unit 110 and the internal communication unit 120.

That is, when the external communication unit 110 receives a command or information from the external device O, the received information may be transmitted to the control unit 130, and the control unit 130 may perform necessary operations based on the received information. For example, the control unit 130 may receive a wake-up signal from the external device O and switch the master BMS 100 from a sleep mode to a wake-up mode.

In addition, when the internal communication unit 120 receives state information of the battery module 10 from the slave BMS 200, the control unit 130 may perform necessary operations based on the received information. For example, the control unit 130 may receive voltage information or temperature information of each battery module 10 from the entire slave BMSs 200, and may control a charging/discharging operation of a specific battery module 10 or charging/discharging operations of the entire battery pack based on the received information. In particular, the control unit 130 may manage the slave BMS 200 by performing an appropriate processing operation based on the information transmitted and received through the internal communication unit 120.

The control unit 130 may be implemented by a MCU provided in the master BMS 100, but the present disclosure is not limited thereto. In order to implement various control logics, the control unit 130 may selectively include processors, application-specific integrated circuits (ASICs), other chipsets, logic circuits, registers, communication modems, data processors, and the like. In addition, when the control logic is implemented by software, the control unit 130 may be implemented by a set of program modules. In this case, the program modules may be stored in a memory and may be executed by a processor. The memory may be provided inside or outside the processor, and may be connected to the processor by well-known various methods. In addition, the memory collectively refers to a device configured to store information without regard to a type of a device, and does not refer to a specific memory device. One or more of various control logics of the control unit 130 may be combined, and the combined control logics may be created in the form of a computer-readable code system and recorded on a computer-readable recording medium. A type of the recording medium is not particularly limited as long as the recording medium is accessible by a processor included in a computer. Examples of the recording medium include at least one selected from the group consisting of a ROM, a RAM, a register, a CD-ROM, a magnetic tape, a hard disk, a floppy disk, and an optical data recording device. In addition, the code system may be modulated into a carrier signal and included in a communication carrier at a specific time point, and may be distributed, stored, and executed in a computer connected via a network. In addition, functional programs, codes, and code segments for implementing the combined control logics may be easily inferred by programmers skilled in the art to which the present application pertains.

The master BMS 100 may be supplied with power necessary for driving from the outside of the battery pack, instead of the battery pack. To this end, as illustrated in FIG. 2, the master BMS 100 may further include a power supply unit 140.

The power supply unit 140 may be supplied with power from the external device O of the battery pack. The power supply unit 140 may supply power from the external device O to various elements of the master BMS 100. For example, the power supply unit 140 may supply necessary power to the external communication unit 110, the internal communication unit 120, and the control unit 130 by using the power supplied from the external device O.

In this case, the magnitude of the voltage supplied to each element of the master BMS 100 may be different from the magnitude of the voltage supplied from the external device O. Therefore, the power supply unit 140 may convert the magnitude of the voltage supplied from the external device O into a voltage magnitude appropriate to each element of the master BMS 100. For example, the power supply unit 140 may convert the voltage supplied from the external device O into 3.3 V and supply the voltage of 3.3 V to each element.

Meanwhile, as illustrated in FIG. 1, the battery pack may include a relay 20 on a large current path, that is, a charge/discharge path C. The charge/discharge path C of the battery pack may be blocked by the relay 20. The master BMS 100 may control the relay 20 to turn on and off the large current path of the battery pack. To this end, as illustrated in FIG. 2, the master BMS 100 may further include a relay driving unit 150.

The relay driving unit 150 may turn on or off the relay 20 provided on the charge/discharge path C of the battery pack. In this case, the relay driving unit 150 may receive a command from the control unit 130 with respect to the on/off operation of the relay 20. That is, when the control unit 130 issues a command of turning off the relay 20, the relay driving unit 150 may turn off the relay 20 according to the command.

The slave BMS 200 may be provided inside the battery pack. In particular, when a plurality of battery modules 10 are included in the battery pack, a plurality of slave BMSs 200 may also be provided in the battery pack. In this case, the plurality of slave BMSs 200 may manage the plurality of battery modules 10, respectively.

The slave BMS 200 may be connected to the battery module 10 to control the battery module 10. A control function of the slave BMS 200 may include a charging/discharging control of a battery cell included in the battery module 10, that is, a secondary battery, a smoothing control, a switching, an electrical characteristic value measurement and monitoring, an error display, an on/off control, and the like. In addition, the slave BMS 200 may execute various electrical and electronic control functions known at the time of filing of the present application.

Figure 3:
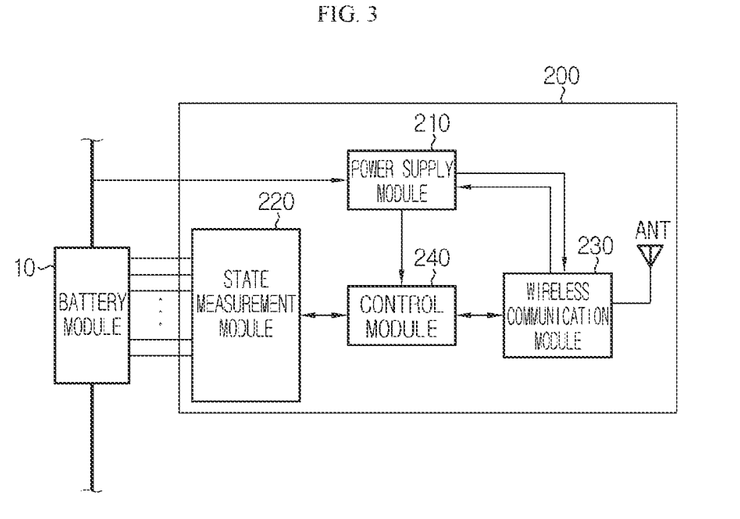
FIG. 3 is a block diagram schematically illustrating a functional configuration of a slave BMS according to an embodiment of the present disclosure.

FIG. 3 is a block diagram schematically illustrating a functional configuration of the slave BMS 200 according to an embodiment of the present disclosure.

Referring to FIG. 3, the slave BMS 200 may include a power supply module 210, a state measurement module 220, a wireless communication module 230, and a control module 240.

The power supply module 210 may be supplied with power from the battery module 10. That is, the power supply module 210 may be supplied with power from the corresponding battery module 10 on which the slave BMS 200 is mounted. The power supply module 210 may transmit power supplied from the battery module 10 to each element of the slave BMS 200, for example, the control module 240 and the wireless communication module 230. Therefore, the control module 240 and the wireless communication module 230 may be driven by using the power transmitted from the power supply module 210.

Figure 4:
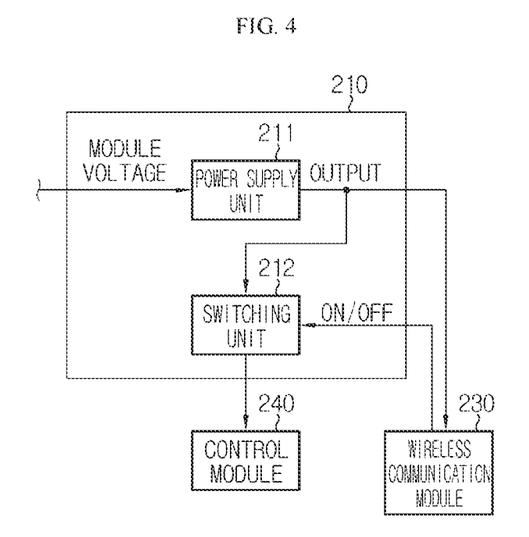
FIG. 4 is a diagram schematically illustrating a detailed configuration of a power supply module according to an embodiment of the present disclosure.

FIG. 4 is a diagram schematically illustrating a detailed configuration of the power supply module 210 according to an embodiment of the present disclosure.

Referring to FIG. 4, the power supply module 210 may include a power supply unit 211 and a switching unit 212.

The power supply unit 211 may be supplied with power from the battery module 10 and convert the supplied power into an appropriate voltage. In particular, since powers supplied from the battery module 10 have a large magnitude of voltages, the powers may be converted into a voltage magnitude appropriate to each element of the slave BMS 200, for example, the wireless communication module 230 or the control module 240. For example, the power supply unit 211 may output a voltage of 3.3 V with respect to the power supplied from the battery module 10 and supply the voltage of 3.3 V to the wireless communication module 230 and the control module 240. As the power supply unit 211, various voltage converters (e.g., a regulator) known at the time of filing of the present application may be used.

The switching unit 212 may be disposed between the power supply unit 211 and the control module 240 to turn on and off a path through which power supplied by the power supply unit 211 is supplied to the control module 240. In particular, as illustrated in FIG. 4, the switching unit 212 may be turned on or off in response to an on/off control signal of the wireless communication module 230. For example, when a turn-on signal is transmitted from the wireless communication module 230, the switching unit 212 may be turned on so that a driving power of 3.3 V is supplied from the power supply unit 211 to the control module 240. Thus, the control module 240 may normally operate. The switching unit 212 may be implemented by a switching element known at the time of filing of the present application, for example, various switches such as a field effect transistor (FET).

The state measurement module 220 may measure state information of the battery module 10, particularly information about a state including at least one of a voltage and a temperature of the battery module 10. The state measurement module 220 may transmit the measurement result to the control module 240, or may perform an appropriate processing operation based on the measurement result.

Figure 5:
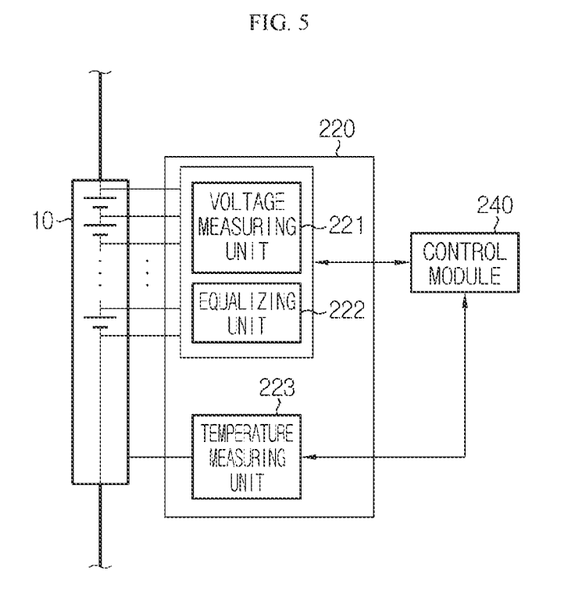
FIG. 5 is a diagram schematically illustrating a detailed configuration of a state measurement module according to an embodiment of the present disclosure.

FIG. 5 is a diagram schematically illustrating a detailed configuration of the state measurement module 220 according to an embodiment of the present disclosure.

Referring to FIG. 5, the state measurement module 220 may include a voltage measuring unit 221, an equalizing unit 222, and a temperature measuring unit 223.

The voltage measuring unit 221 may measure a voltage of the battery module 10. In particular, the voltage measuring unit 221 may measure an entire voltage of the battery module 10, and may measure a voltage across both ends of each battery cell provided in the battery module 10, that is, each secondary battery. The voltage measuring unit 221 may include a voltage sensor that measures a voltage across both ends of the battery cell or the battery module, or a current sensor that measures a current flowing through the battery cell or the battery module.

The voltage measuring unit 221 may convert the measured voltage into a digital value. The voltage measuring unit 221 may transmit the digital-converted voltage value to the control module 240. Alternatively, the voltage measuring unit 221 may store the measured voltage in a memory or the like.

When there is a difference in voltages of the respective secondary batteries provided in the battery module 10, the equalizing unit 222 may perform an operation of equalizing the voltages of the secondary batteries. To this end, the equalizing unit 222 may be configured so that current paths are formed at both ends of each secondary battery and switching elements are provided on the current paths. The equalizing unit 222 may control the switching elements to decrease or increase the voltage of each secondary battery. In this manner, the equalizing unit 222 may perform voltage balancing of the secondary batteries.

In addition, the equalizing unit 222 may include a resistive element. In this case, the equalizing unit 222 may connect a specific secondary battery to the resistive element so that power of the specific secondary battery is consumed by the resistive element. Thus, the equalizing unit 222 may perform a balancing operation of decreasing the voltage of the secondary battery. Alternatively, the equalizing unit 222 may supply the power of the specific secondary battery to another secondary battery through the control of the switching unit 212, or may supply the power to the entire battery module 10 through the control of the switching unit 212.

The temperature measuring unit 223 may measure a temperature of the battery module 10. For example, the temperature measuring unit 223 may measure an external temperature and/or an internal temperature of the battery module 10. In addition, the temperature measuring unit 223 may measure temperatures of several positions in the battery module 10 so as to grasp the temperature of the battery module 10 at each portion in more detail. Meanwhile, the temperature measuring unit 223 may transmit the measured temperature information of the battery module 10 to the control module 240. The temperature measuring unit 223 may include a temperature sensor known at the time of filing of the present application. In addition, the temperature measured by the temperature measuring unit 223 may be stored in a memory or the like.

The wireless communication module 230 may communicate with the master BMS 100 provided in the battery pack. In particular, the wireless communication module 230 may wirelessly exchange a signal with the master BMS 100. To this end, the wireless communication module 230 may include an RF system on chip (RFSoC). In this case, the RFSoC may be connected to the master BMS 100, for example, the RFIC of the master BMS 100, through an internal wireless link and perform communication therewith.

In addition, the wireless communication module 230 may include an antenna and an amplifier. For example, the wireless communication module 230 may receive a signal wirelessly transmitted from the RFIC of the master BMS 100 through the antenna and the amplifier. In addition, the wireless communication module 230 may transmit information transmitted from the control module 240 to the RFIC of the master BMS 100 through the antenna and the amplifier.

Meanwhile, the wireless communication module 230 may be supplied with power necessary for driving from the power supply unit 211 of the power supply module 210. In addition, the wireless communication module 230 may control the on/off operation of the switching unit 212 of the power supply module 210 so as to turn on and off the power supplied from the power supply unit 211 to the control module 240.

The control module 240 may receive a variety of information from a plurality of elements provided in the slave BMS 200, process the same, and transmit a necessary command to each element.

For example, the control module 240 may receive voltage state information of the respective secondary batteries from the voltage measuring unit 221 of the state measurement module 220 and confirm a voltage difference between the secondary batteries. When the control module 240 determines that a voltage of a predetermined secondary battery is different from those of other secondary batteries, the control module 240 may transmit a command of performing an equalizing operation to the equalizing unit 222 of the state measurement module 220. The equalizing unit 222 may receive the command of the control module 240 and perform the equalizing operation of the battery module 10, that is, the balancing operation.

In another example, the control module 240 may receive temperature information of the battery module 10 from the temperature measuring unit 223 of the state measurement module 220 and determine the presence or absence of an abnormal situation. When the control module 240 determines that the temperature is excessively high, the control module 240 may transmit the information to the master BMS 100 through the wireless communication module 230, so that the master BMS 100 performs an appropriate control operation, for example an operation of turning off the relay 20.

In addition, the control module 240 may receive a control command for the battery module 10 from the master BMS 100 through the wireless communication module 230, and perform an appropriate processing operation according to the control command. For example, the control module 240 may enable the state measurement module 220 to grasp voltage information or temperature information of the battery module 10 according to the command of the master BMS 100.

The slave BMS 200 may generally include a MCU. The control module 240 may be configured to execute the function by the MCU of the slave BMS 200, but the present disclosure is not necessarily limited thereto. That is, according to the present disclosure, the control module 240 may be implemented by not the MCU of the related-art slave BMS 200 but a device separately mounted on the slave BMS 200.

In order to implement various control logics, the control module 240 may selectively include processors, ASICs, other chipsets, logic circuits, registers, communication modems, data processors, and the like. In addition, when the control logic is implemented by software, the control module 240 may be implemented by a set of program modules. In this case, the program modules may be stored in a memory and may be executed by a processor. The memory may be provided inside or outside the processor, and may be connected to the processor by well-known various methods. In addition, the memory collectively refers to a device configured to store information without regard to a type of a device, and does not refer to a specific memory device. One or more of various control logics of the control module 240 may be combined, and the combined control logics may be created in the form of a computer-readable code system and recorded on a computer-readable recording medium. A type of the recording medium is not particularly limited as long as the recording medium is accessible by a processor included in a computer. Examples of the recording medium include at least one selected from the group consisting of a ROM, a RAM, a register, a CD-ROM, a magnetic tape, a hard disk, a floppy disk, and an optical data recording device. In addition, the code system may be modulated into a carrier signal and included in a communication carrier at a specific time point, and may be distributed, stored, and executed in a computer connected via a network. In addition, functional programs, codes, and code segments for implementing the combined control logics may be easily inferred by programmers skilled in the art to which the present application pertains.

In particular, in the battery pack management device according to the present disclosure, the wireless communication module 230 may repeatedly perform turn-on and turn-off. That is, the wireless communication module 230 may not be always turned on and may be maintained respectively in a turn-on period and a turn-off period, in at least some situations or some times.

For example, the wireless communication module 230 may be turned on during a first time period, and may be maintained in a turned-off state during a second time period. When the second time period is completed, the wireless communication module 230 may enter the first time period again and be turned on.

In such a configuration, the control module 240 may control the on/off time of the wireless communication module 230. That is, the control module 240 may control the wireless communication module 230 with respect to when the wireless communication module 230 is turned on or off, and the like. In addition, the control module 240 may control the wireless communication module 230 with respect to how long the turn-on time or turn-off time of the wireless communication module 230 has to be maintained.

According to the configuration of the present disclosure, the wireless communication module 230 is not always turned on and is turned off for a predetermined time, thereby reducing power consumption of the wireless communication module 230. The wireless communication module 230 is supplied with driving power from the power supply module 210. Since the driving power is supplied from the battery module 10, the power consumption of the battery module 10 may be reduced. Therefore, it is possible to minimize the problem that the vehicle does not start up or the driving distance of the vehicle is shortened due to the power consumption of the battery module 10.

In particular, the wireless communication module 230 may alternately repeat the turned-on state and the turned-off state when the vehicle is in the off-state. For example, when the vehicle is in the on-state, the wireless communication module 230 may continuously maintain the turned-on state. However, when the vehicle is in the off-state, the wireless communication module 230 may alternately repeat the turned-on state and the turned-off state. According to the configuration of the present disclosure, since the wireless communication module 230 is always turned on when the vehicle is in operation, the signal reception of the slave BMS 200 may be quickly performed. When the vehicle is in the off-state, the power consumption for maintaining the turned-on state of the wireless communication module 230 is reduced, thereby preventing the battery module 10 from being discharged.

Preferably, the wireless communication module 230 may be turned on or off at predetermined intervals. That is, the wireless communication module 230 may be periodically turned on and off. For example, the wireless communication module 230 may be turned on or off at every 110 ms.

The wireless communication module 230 may maintain the turned-on state and the turned-off state for a predetermined time. For example, when the wireless communication module 230 is turned on, the wireless communication module 230 may maintain the turned-on state for 10 ms and be then turned off after the elapse of 10 ms. Then, the wireless communication module 230 may maintain the turned-off state for 100 ms and be then turned on again after the elapse of 100 ms from the turning-off. In this case, the wireless communication module 230 may maintain the turned-on state for 10 ms and maintain the turned-off state for 100 ms, and the turn-on and turn-off period may be 110 ms.

The turn-on and turn-off period of the wireless communication module 230 may be controlled and changed by the control module 240.

In particular, the control module 240 may change the turn-on and turn-off period of the wireless communication module 230 when the vehicle is not in operation. When the vehicle is in operation, that is, when the start-up of the vehicle is turned on, the wireless communication module 230 of the slave BMS 200 is continuously turned on. Thus, it is preferable to quickly exchange data with the master BMS 100. However, when the vehicle is not in operation, that is, when the start-up of the vehicle is turned off, the wireless communication module 230 of the slave BMS 200 is turned off for a predetermined time. Thus, it is possible to reduce unnecessary power consumption due to the standby of the wireless communication module 230.

Preferably, the control module 240 may control the on/off operation of the wireless communication module 230 with respect to a vehicle parking state.

In particular, the control module 240 may control the on/off time of the wireless communication module 230 according to a parking time of a vehicle. The parking may refer to a state in which the start-up of the vehicle is turned off. That is, the control module 240 may control the on/off time of the wireless communication module 230 according to how much the time has elapsed in a state in which the start-up of the vehicle is turned off.

The control module 240 may directly measure the parking time of the vehicle, or the control module 240 may receive information about the parking time from another device outside the battery pack, for example, an ECU. Even when the control module 240 measures the parking time of the vehicle, the control module 240 may receive, from the external device O such as the ECU, information indicating that the start-up of the vehicle has been turned off, and measure the parking time of the vehicle based on the received information.

The control module 240 may divide the parking time of the vehicle into two or more sections and differently set the on/off time of the wireless communication module 230 according to each section. For example, the control module 240 may divide the parking time of the vehicle into a section of less than 24 hours and a section of 24 hours or more and differently sets the turn-off duration time of the wireless communication module 230.

More preferably, as the parking time of the vehicle increases, the control module 240 may increase the off time of the wireless communication module 230. That is, when the parking time exceeds a predetermined reference time, the control module 240 may control the wireless communication module 230 to increase the off time of the wireless communication module 230.

For example, when the parking time of the vehicle is less than 24 hours, the control module 240 may set the turn-off duration time of the wireless communication module 230 to 100 ms. In this case, when the wireless communication module 230 is turned off once, the wireless communication module 230 maintains the turned-off state for 100 ms. On the other hand, when the parking time of the vehicle is 24 hours or more, the control module 240 may change the turn-off duration time of the wireless communication module 230 to 300 ms. In this case, when the wireless communication module 230 is turned off once, the wireless communication module 230 maintains the turned-off state for 300 ms. In such a configuration, as the parking time increases, the turn-off period length of the wireless communication module 230 may increase.

According to the configuration of the present disclosure, the turn-off period of the wireless communication module 230 may be adaptively changed according to the parking time of the vehicle. That is, when the parking time is short, it is unlikely that the secondary battery of the battery module 10 will be discharged by the standby power, so that the turn-off period can be shortened. In this case, the user of the battery module 10, for example, the driver of the vehicle, may feel that the battery module 10 is quickly woken up. However, as the parking time becomes longer, it is likely that the battery will be discharged by the accumulated standby power. If the turn-off period increases as the parking time increases as in the embodiment, the standby power may be reduced. Thus, in this case, even if the driver does not use the vehicle for a long time due to business trip or travel, it is possible to prevent standby power from being excessively consumed, thereby preventing the discharge of the battery or the like. In addition, the case where the vehicle is not used for a long time occurs sometimes. In this case, even if the wake-up of the battery is somewhat delayed as compared with the case where the vehicle is frequently used, it is likely that the driver will understand such a situation.

Meanwhile, the case where the turn-off time of the wireless communication module 230 is changed based on one reference time has been described in the above embodiment, but the present disclosure is not necessarily limited thereto. That is, the control module 240 may change the turn-off time of the wireless communication module 230 stepwise based on two or more reference times in association with the parking time. In this case, the control module 240 may divide the parking time into three or more time intervals and separately set the turn-off time of the wireless communication module 230.

For example, the control module 240 may set 10 hours as a first reference time and 20 hours as a second reference time in association with the parking time of the vehicle. The control module 240 may separately set the turn-off time of the wireless communication module 230 to 100 ms as a first off time, 200 ms as a second off time, and 300 ms as a third off time. In this case, when the parking time of the vehicle is less than 10 hours (first time interval), the turn-off time of the wireless communication module 230 may be set to 100 ms. When the parking time of the vehicle is equal to or more than 10 hours and less than 20 hours (second time interval), the turn-off time of the wireless communication module 230 may be set to 200 ms. When the parking time of the vehicle is 20 hours or more (third time interval), the turn-off time of the wireless communication module 230 may be set to 300 ms.

In addition, the control module 240 may preferably control the on/off time of the wireless communication module 230 according to the voltage of the battery module 10.

That is, the state measurement module 220 of the slave BMS 200 may measure the voltage of the battery module 10, and the measured voltage information may be transmitted to the control module 240 provided in the same slave BMS 200. The control module 240 may set the turn-on time and/or the turn-off time of the wireless communication module 230 according to the received voltage measurement result of the battery module 10.

Furthermore, the control module 240 may control the turn-on time and/or the turn-off time of the wireless communication module 230 according to the voltage measurement information of the battery module 10 in a state in which the start-up of the vehicle is turned off. Even when the battery module 10 is in a sleep mode, the slave BMS 200 may be periodically woken up. In such a wake-up state, the state measurement module 220 may measure the voltage of the battery module 10.

In particular, as the measured voltage of the battery module 10 decreases, the control module 240 may increase the off time of the wireless communication module 230. That is, when the voltage of the battery module 10 is lower than a predetermined reference voltage, the control module 240 may control the wireless communication module 230 to increase the turn-off time of the wireless communication module 230.

For example, when the measured voltage of the battery module 10 is 20 V or more, the control module 240 may set the turn-off duration time of the wireless communication module 230 to 100 ms. On the other hand, when the measured voltage of the battery module 10 is less than 20 V, the control module 240 may increase the turn-off duration time of the wireless communication module 230 to 200 ms.

According to the configuration of the present disclosure, the turn-off period of the wireless communication module 230 may be adaptively changed according to the voltage of the battery module 10. That is, when the voltage of the battery module 10 is a predetermined level or less, the turn-off duration time of the wireless communication module 230 is increased, thereby reducing the power consumption of the battery module 10 due to the wireless communication module 230. In particular, in such a configuration, it is possible to prevent a problem that the battery module 10 is discharged by the wireless communication module 230 and thus the use of the battery pack is impossible.

Furthermore, the control module 240 may divide the voltage of the battery module 10 into voltage sections of three or more levels and differently set the turn-off duration time according to the divided voltage sections. That is, the control module 240 may divide the turn-off duration time of the wireless communication module 230 into three or more levels according to the voltage of the battery module 10.

For example, the control module 240 may set a first reference voltage to 20 V and a second reference voltage to 15 V. In this case, the voltage section of the battery module 10 may be divided into three sections: 20 V or more as a first voltage section, 15 V or more and less than 20 V as a second voltage section, and less than 15 V as a third voltage section. In the first voltage section, the control module 240 may maintain the turn-off time of the wireless communication module 230 at 100 ms. Next, in the second voltage section, the control module 240 may maintain the turn-off time of the wireless communication module 230 at 200 ms. In the third voltage section, the control module 240 may maintain the turn-off time of the wireless communication module 230 at 300 ms. That is, in the third voltage section among the entire voltage sections, the control module 240 may relatively maximize the turn-off time of the wireless communication module 230.

According to the configuration of the present disclosure, the turn-off time of the wireless communication module 230 is more finely adjusted according to the voltage of the battery module 10, thereby adaptively coping with the wake-up time and standby power consumption problem of the battery module 10. In particular, when the voltage of the battery module 10 falls near a discharge limit point, the turn-off time of the wireless communication module 230 is maximized, thereby preventing the cell of the battery module 10 from being completely discharged.

In addition, the control module 240 may preferably control the on/off time of the wireless communication module 230 according to the temperature of the battery module 10.

That is, the state measurement module 220 of the slave BMS 200 may measure the temperature of the battery module 10, and the measured temperature information may be transmitted to the control module 240. The control module 240 may set the turn-on time and/or the turn-off time of the wireless communication module 230 according to the received temperature information of the battery module 10.

In particular, as the measured temperature of the battery module 10 decreases, the control module 240 may increase the turn-off time of the wireless communication module 230. That is, when the temperature of the battery module 10 is lower than a predetermined reference temperature, the control module 240 may control the wireless communication module 230 to increase the off time of the wireless communication module 230.

For example, when the measured temperature of the battery module 10 is 0° C. or more, the control module 240 may set the turn-off duration time of the wireless communication module 230 to 100 ms. On the other hand, when the measured temperature of the battery module 10 is less than 0° C., the control module 240 may increase the turn-off duration time of the wireless communication module 230 to 200 ms.

According to the configuration of the present disclosure, it is possible to prevent the battery module 10 from being quickly discharged in a state in which the temperature of the battery module 10 is low. That is, when the temperature of the battery module 10 is low, the performance of each secondary battery provided in the battery module 10 cannot be properly exhibited, and thus the output voltage may be lowered or discharged more quickly. However, according to the embodiment, the standby power consumption of the battery module 10 is reduced at a low temperature, and thus, it is possible to reduce a problem that the start-up of the vehicle is not performed or the driving distance is reduced due to the low power of the battery module 10 in a low temperature condition such as a winter season.

In addition, even in the embodiment in which the off time of the wireless communication module 230 is changed according to the temperature of the battery module 10, the turn-off time may be set to three or more levels. For example, the control module 240 may divide the temperature of the battery module 10 into temperature sections of three or more levels and set the turn-off time of the wireless communication module 230 to sections of three or more levels. In this case, the off time of the wireless communication module 230 may be more finely adjusted according to the temperature of the battery module 10.

Meanwhile, when the measured temperature of the battery module 10 is a reference temperature or more, the control module 240 may decrease the off time of the wireless communication module 230.

For example, the control module 240 may maintain the turn-off time of the wireless communication module 230 at 100 ms in the temperature section in which the measured temperature of the battery module 10 is 0° C. to 70° C., and may reduce the turn-off duration time of the wireless communication module 230 from 100 ms to 50 ms when the temperature of the battery module 10 is 70° C. or more.

According to the configuration of the present disclosure, the emergency situation of the battery module 10 can be detected more quickly. For example, in the event of heat or fire in the battery module 10 or the vehicle due to abnormality of the battery module 10 or the vehicle, the temperature of the battery module 10 may increase. In this case, since the turn-off time of the wireless communication module 230 is reduced, the slave BMS 200 may perform wake-up, perform functions, and transmit information more quickly.

More preferably, the control module 240 may control the on/off time of the wireless communication module 230 according to a traveling time pattern of the vehicle. The traveling time pattern of the vehicle may be information obtained by patterning the time zone in which the vehicle travels. Furthermore, the traveling time pattern of the vehicle may be pattern information about the time at which the vehicle mainly starts traveling.

In particular, the control module 240 may analyze the traveling time pattern of the vehicle. Furthermore, the control module 240 may set the time zone (traveling start time zone) in which the traveling start frequency of the vehicle is highest. For example, the control module 240 may receive, from the external device O of the battery pack, information indicating that the vehicle has started. The control module 240 may store, in the memory, time information indicating when the vehicle has started traveling, based on the time when the information has been received. The control module 240 may build a database in relation to the traveling start time of the vehicle. The control module 240 may analyze the time zone in which the vehicle is most likely to start traveling, and set the same as a time zone (traveling start time zone) in which the traveling start frequency is highest. In addition, the control module 240 may decrease the turn-off time of the wireless communication module 230 in the set time zone.

In this case, the control module 240 may divide the time zone based on a day (24 hours). More specifically, the control module 240 may divide the time of 0 hour to 24 hours into a plurality of time zones, and determine in which one of the plurality of time zones the vehicle mainly starts. The control module 240 may reduce the turn-off time of the wireless communication module 230 at a point in the time zone determined as the time at which the vehicle most starts, for example, the start point of the corresponding time zone.

For example, the control module 240 may divide the time of the day into 12 time intervals on the 2-hour basis. When the time point at which the vehicle mainly starts traveling, that is, the time zone in which the vehicle mainly starts, is detected as a time zone between 5 am to 7 am, the control module 240 may reduce the turn-off time of the wireless communication module 230 at the time of entering the time zone, that is, 5 am. More specifically, the control module 240 may set the turn-off time of the wireless communication module 230 to 300 ms until 5 am from the time point when the traveling of the vehicle is completed, and set the turn-off time of the wireless communication module 230 to 100 ms from 5 am.

According to the configuration of the present disclosure, since the on/off period of the wireless communication module 230 is determined according to the traveling pattern of the vehicle, it is possible to perform the on/off control of the wireless communication module 230 optimized for the driving pattern or the living pattern of the driver of the vehicle. That is, the standby power consumption of the battery module 10 is minimized by increasing the turn-off time of the wireless communication module 230 at the time point at which it is predicted that the driver will not normally drive the vehicle. The battery module 10 of the vehicle being parked may be quickly woken up by decreasing the turn-off time of the wireless communication module 230 at the time point when it is predicted that the driver will start driving the vehicle.

In addition, even in the configuration in which the turn-off time is controlled according to the traveling time pattern of the vehicle, the control module 240 may control the turn-off time by differentially dividing the turn-off time into three or more levels. For example, the control module 240 may maintain the turn-off time of the wireless communication module 230 at 200 ms until before 3 am, and decrease the turn-off duration time of the wireless communication module 230 to 150 ms in the time zone of 4 am to 5 am. Furthermore, the control module 240 may further decrease the turn-off duration time of the wireless communication module 230 to 100 ms in the time zone of 5 am to 6 am.

According to the configuration of the present disclosure, the standby power consumption and quick wake-up of the battery module 10 may be more efficiently performed considering the traveling start time of the vehicle more precisely.

Meanwhile, in the above configuration, the turn-off time of the wireless communication module 230 may be increased again after a predetermined time has elapsed in a state in which the turn-off time of the wireless communication module 230 is decreased considering the traveling time pattern of the vehicle. That is, when the vehicle does not start up even after the time zone in which the vehicle most starts, the control module 240 may increase the turn-off time of the wireless communication module 230 again. For example, when it is determined that the vehicle does not start up even after the time enters the zone of 5 am to 7 am, the control module 240 may change the turn-off time of the wireless communication module 230 again from 100 ms to 300 ms at the time point when the time zone is completed, that is, the time point of 7 am. In this case, after a predetermined has elapsed, the turn-off time of the wireless communication module 230 may return to the original state. According to the above embodiment, the situation in which the vehicle does not travel every day may be considered.

In addition, in the above configuration, the turn-off time of the wireless communication module 230 may sequentially return to the original state without returning to the original state at a time. That is, when the vehicle does not start even after entering the time zone in which the vehicle most starts, the control module 240 may primarily increase the turn-off time of the wireless communication module 230 after a first time has elapsed, and secondarily increase the turn-off time of the wireless communication module 230 after a second time longer than the first time has elapsed. For example, the control module 240 decreases the turn-off time of the wireless communication module 230 from 300 ms to 100 ms at 5 am. However, when it is determined that the vehicle does not start, the control module 240 may increase the turn-off time of the wireless communication module 230 from 100 ms to 200 ms at 6 am. After that, when it is determined that the vehicle does not start, the control module 240 may increase the turn-off time of the wireless communication module 230 from 200 ms to 300 ms at 7 am.

Meanwhile, in the above embodiments, the case where the control module 240 increases or decreases the turn-off time of the wireless communication module 230 according to each situation has been described, but the control module 240 may change the turn-on time of the wireless communication module 230 instead of the turn-off time of the wireless communication module 230. For example, the control module 240 may increase the turn-on time of the wireless communication module 230 in the time zone in which the traveling start frequency of the vehicle is highest. More specifically, when it is analyzed that the traveling of the vehicle is mainly performed between 5 am and 6 am, the control module 240 may maintain the turn-on time of the wireless communication module 230 at 10 ms before 5 am, and increase the turn-on time of the wireless communication module 230 to 20 ms from the time point of 5 am. In this case, the turn-off time of the wireless communication module 230 is relatively decreased by increasing only the turn-on time of the wireless communication module 230 instead of the turn-off time of the wireless communication module 230.

In addition, the control module 240 may change both the turn-on time and the turn-off time of the wireless communication module 230 in various situations described above. For example, the control module 240 may increase the turn-off time of the wireless communication module 230 as the parking time of the vehicle increases, and decrease the turn-on time of the wireless communication module 230 accordingly. More specifically, when the parking time of the vehicle exceeds a reference time, the control module 240 may increase the turn-off time of the wireless communication module 230 from 100 ms to 200 ms, and decrease the turn-on time of the wireless communication module 230 from 10 ms to 5 ms.

Meanwhile, the control module 240 of the slave BMS 200 may configure a packet by adding a cyclic redundancy check (CRC) code to a data frame when data is transmitted to the master BMS 100. In this case, the control unit 130 of the master BMS 100 checks a data CRC of a packet received from the control module 240, so as to verify whether a data error occurs in the wireless communication module 230 of the slave BMS 200 or the internal communication unit 120 of the master BMS 100.

In addition, the control module 240 may transmit a specific signal to the wireless communication module 230 of the corresponding slave BMS 200. In this case, when no signal is received from the control module 240 within a designated time, the wireless communication module 230 may determine that an error occurs in the operation of the control module 240. The wireless communication module 230 may attempt the normal recovery of the control module 240 by toggling the switching unit 212 of the power supply module 210 to reset the control module 240.

According to the configuration of the present disclosure, in the slave BMS 200 or the master BMS 100, it is possible to more effectively diagnose the state of the control part such as the MCU or the communication part such as the RFID, thereby further improving the functional stability of the battery pack management device.

The battery pack management device according to the present disclosure may be applied to a battery pack itself. Therefore, the battery pack according to the present disclosure may include the battery pack management device described above.

In addition, the battery pack management device according to the present disclosure may be applied to a vehicle. Therefore, the vehicle according to the present disclosure may include the battery pack management device described above. In this case, the battery pack management device may be provided inside the battery pack, provided outside the battery pack, or provided in the vehicle itself. In particular, since the standby power consumption of the battery module 10 is reduced when the vehicle does not travel, the battery pack management device according to the present disclosure may minimize the problem that the vehicle does not start in a situation in which the vehicle must travel, or the driving distance is reduced.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The term "module" such as "power supply module", "state measurement module", "wireless communication module", and "control module" is used herein, and the term "unit" such as "external communication unit", "internal communication unit", and "control unit" is used herein, but these terms indicate logical configuration units, and it is obvious to those skilled in the art that these terms do not necessarily indicate the elements that can be physically separated or need to be physically separated.

What is claimed is:

1. A battery pack management device, comprising:
a master battery management system (BMS) including:
an external communication unit configured to transmit and receive a signal to and from an external device of a battery pack, the battery pack including a battery module and being mountable on a vehicle,
an internal communication unit configured to transmit and receive a wireless communication signal to and from a slave BMS provided in the battery pack; and
a controller programmed to process data received through the external communication unit and the internal communication unit; and
the slave BMS including:
a state measurement module configured to measure state information of at least one of a voltage and a temperature of the battery module;
a wireless communication module configured to transmit and receive a wireless communication signal to and from the master BMS; and
a control module programmed to:
control an on/off time of the wireless communication module based on information of the vehicle,
maintain a predetermined turn-off time of the wireless communication module when the temperature of the battery module is between a first reference temperature and a second reference temperature,
increase a turn-off time of the wireless communication module when the temperature of the battery module is below the first reference temperature, and
decrease a turn-off time of the wireless communication module when the temperature of the battery module is above the second reference temperature.

2. The battery pack management device of claim 1, wherein the wireless communication module is turned on or off at predetermined intervals.

3. The battery pack management device of claim 1, wherein the control module is programmed to increase a turn-off time of the wireless communication module as a parking time of the vehicle increases.

4. The battery pack management device of claim 1, wherein the control module is programmed to increase a turn-off time of the wireless communication module as the voltage of the battery module decreases.

5. A battery pack management device, comprising:
a master battery management system (BMS) including:
an external communication unit configured to transmit and receive a signal to and from an external device of a battery pack, the battery pack including a battery module and being mountable on a vehicle,
an internal communication unit configured to transmit and receive a wireless communication signal to and from a slave BMS provided in the battery pack; and
a controller programmed to process data received through the external communication unit and the internal communication unit; and
the slave BMS including:
a state measurement module configured to measure state information of at least one of a voltage and a temperature of the battery module;
a wireless communication module configured to transmit and receive a wireless communication signal to and from the master BMS; and
a control module programmed to control an on/off time of the wireless communication module based on information of the vehicle or information of the battery module,
wherein the control module is programmed to set a time zone in which a traveling start frequency of the vehicle is highest, and decrease a turn-off time of the wireless communication module in the set time zone.

6. The battery pack management device of claim 1, wherein the control module is programmed to measure a parking time of the vehicle, or receive information about the parking time of the vehicle from another device outside the battery pack.

7. The battery pack management device of claim 6, wherein the control module is programmed to divide the parking time of the vehicle into at least two sections and differently set the on/off time of the wireless communication module according to each of the at least two sections.

8. A battery pack management device, comprising:
a master battery management system (BMS) including:
an external communication unit configured to transmit and receive a signal to and from an external device of a battery pack, the battery pack including a battery module and being mountable on a vehicle,
an internal communication unit configured to transmit and receive a wireless communication signal to and from a slave BMS provided in the battery pack; and
a controller programmed to process data received through the external communication unit and the internal communication unit; and
the slave BMS including:
a state measurement module configured to measure state information of at least one of a voltage and a temperature of the battery module;
a wireless communication module configured to transmit and receive a wireless communication signal to and from the master BMS; and
a control module programmed to control an on/off time of the wireless communication module based on information of the vehicle or information of the battery module,
wherein the control module is programmed to control the on/off time of the wireless communication module according to a traveling time pattern of the vehicle, and
wherein the traveling time pattern of the vehicle is obtained by patterning a time zone in which the vehicle travels.

9. The battery pack management device of claim 1, wherein the control module is further programmed to control the on/off time of the wireless communication module according to at least one selected from a parking time of the vehicle, a voltage of the battery module that is measured by the state measurement module, or a traveling time pattern of the vehicle.

10. A battery pack comprising the battery pack management device of claim 1.

11. A vehicle comprising the battery pack management device of claim 1.

* * * * *